United States Patent
Prystupa et al.

(10) Patent No.: US 12,083,724 B2
(45) Date of Patent: Sep. 10, 2024

(54) FIELD PROGRAMMABLE FLUIDIC ARRAY

(71) Applicant: 11886851 Canada Ltd., Winnipeg (CA)

(72) Inventors: David Allan Prystupa, Pinawa (CA); John Stephen Pacak, Winnipeg (CA); Peter Condie Nell, Winnipeg (CA)

(73) Assignee: 11886851 Canada Ltd., Winnipeg (CA)

( * ) Notice: Subject to any disclaimer, the term of this patent is extended or adjusted under 35 U.S.C. 154(b) by 760 days.

(21) Appl. No.: 17/178,586

(22) Filed: Feb. 18, 2021

(65) Prior Publication Data
US 2021/0252757 A1   Aug. 19, 2021

Related U.S. Application Data

(60) Provisional application No. 62/978,680, filed on Feb. 19, 2020.

(51) Int. Cl.
| | |
|---|---|
| *B29C 45/46* | (2006.01) |
| *B29C 45/18* | (2006.01) |
| *B29C 45/47* | (2006.01) |
| *B29C 45/56* | (2006.01) |
| *B01L 3/00* | (2006.01) |

(52) U.S. Cl.
CPC ............ *B29C 45/18* (2013.01); *B29C 45/561* (2013.01); *B01L 3/502784* (2013.01); *B29C 2045/5635* (2013.01)

(58) Field of Classification Search
CPC .. B29C 45/18; B29C 45/561; B01L 3/502784
See application file for complete search history.

(56) References Cited

U.S. PATENT DOCUMENTS

| | | | |
|---|---|---|---|
| 3,989,164 A | * 11/1976 | Hager | H01F 7/206 198/619 |
| 2020/0011773 A1 | * 1/2020 | Arnold | G01N 1/38 |

FOREIGN PATENT DOCUMENTS

CA        2882675        4/2013

* cited by examiner

*Primary Examiner* — Dah-Wei D. Yuan
*Assistant Examiner* — Kristen A Dagenais
(74) *Attorney, Agent, or Firm* — Adrian D. Battison; Ade & Company Inc.; Ryan W. Dupuis

(57) ABSTRACT

A method is provided for configuring fluid in a programable fluid array which includes applying a sequence of magnetic fields to a movable fluidic network component; which includes a magnetic object to produce a force on the component. In one arrangement the fluid array includes a plurality of pre-formed channels and at least one property of at least one of said pre-formed channels is changed by the movable fluidic network component in another arrangement the fluid array comprises an injection molding system where the programmable fluid array is used to improve the speed and accuracy of the injection molding process and/or to additionally modify the shape and form of a molded object. In this arrangement the fluidic network component follows a path through the mold cavity determined at least in part by a sequence of magnetic fields and exerts a force on molding material therein.

33 Claims, 5 Drawing Sheets

FIELD PROGRAMMABLE FLUIDIC ARRAY

The invention relates to a system for dynamically reconfiguring a network of fluidic components termed a Field Programmable Fluidic Array (FPFA).

This application claims the benefit under 35 USC 119 (e) of Provisional Application Provisional Application 62/978,680 filed on Feb. 19, 2020 and related to FIELD PROGRAMMABLE FLUIDIC ARRAY, the disclosure of which is incorporated herein by reference.

This application is related to the subject matter of Provisional Application Provisional Application 62/978,671 filed on Feb. 19, 2020 and related to FIELD PROGRAMMABLE ANALOG ARRAY, together with a non-provisional application, filed on a common date with the present application, claiming priority therefrom, the disclosure of both of which documents is incorporated herein by reference.

This application is related to the subject matter of Provisional Application Provisional Application 62/978,675 filed on Feb. 19, 2020 and related to MAGNETIC PLATFORM FOR SAMPLE ORIENTATION, together with a non-provisional application, filed on a common date with the present application, claiming priority therefrom, the disclosure of both of which documents is incorporated herein by reference.

BACKGROUND OF THE INVENTION

This application is related to Method and Apparatus for Singulating Particles in a Stream as described in PCT Application PCT/CA2017/050907 published on 1 Feb. 2018 as WO 2018/018155 which corresponds to U.S. application Ser. No. 15/662,794, the disclosures of which are incorporated herein by reference.

This application is related to High efficiency multiplexing as described in PCT Application PCT/CA2018/050599 published on 29 Nov. 2018 as WO 2018/213923 which corresponds to U.S. application Ser. No. 15/987,279, the disclosures of which are incorporated herein by reference.

This application is related to High resolution multiplexing system as described in PCT Application PCT/CA2019/051625 published on 22 May 2020 as WO 2020/097732 which corresponds to U.S. application Ser. No. 16/683,357, the disclosures of which are incorporated herein by reference.

This application is related to Spatial Modulation Device as described in PCT Application PCT/CA2019/051626 published on 22 May 2020 as WO 2020/097733 which corresponds to U.S. application Ser. No. 16/683,376 filed Nov. 14, 2019, the disclosures of which are incorporated herein by reference.

This application is related to Performing operations on a workpiece using Electromagnetic Forces as described in PCT Application PCT/CA2021/050118 which corresponds to U.S. application Ser. No. 17/166,207 filed Feb. 3, 2021, the disclosures of which are incorporated herein by reference.

SUMMARY OF THE INVENTION

According to the invention there is provided a method for configuring fluid in a programable fluid array comprising the steps of
providing at least one movable fluidic network component with at least one included magnetic object;
applying a sequence of magnetic fields using a magnetic array to the movable fluidic network component;
wherein said magnetic fields interact with the included magnetic object to produce a force on the movable fluidic network component that causes the movable fluidic network component to translate from a first location to a second location in the fluid array.

Fluidic components are defined as any structure that, when placed in contact with a fluid, controls, regulates, or influences a property of the fluid.

The FPFA is comprised of a plurality of fluidic components arranged relative to one another in a user specified configuration. The field programmable network of fluidic components may be formed by modifying a pre-formed grid by placement of incremental fluidic network components, by placement of fluidic network components in a blank prototype region, or by a combination of both methods. Each fluidic network component is associated with a magnetic object, which may be integral to the fluidic network component, or may be linked with the fluidic network component. The fluidic network components are translated and oriented to a desired location by magnetic forces generated by an associated magnetic array to produce a desired fluidic array configuration. Following configuration, the fluidic network components may be permanently fixed in position or reversibly held in position by magnetic forces.

The FPFA provides a rapid prototyping fluidic platform that may be configured dynamically for novel applications conceived by a user in the future, thereby reducing the time and expense of developing a fluidic platform for each novel application. The FPFA may be reconfigured dynamically in a sequence of fluidic network configurations thereby reducing development time for novel applications. The novel applications may for example include sorting and performing diagnostic tests on biological materials such as proteins, lipids, carbohydrates, nucleic acids, cells, and combinations thereof. The FPFA is best used in conjunction with the arrangements described in the above cited U.S. application Ser. No. 17/166,207 filed Feb. 3, 2021 and the arrangement described in the above cited WO 2018/213923.

The FPFA is comprised of an array of fluidic network components which may include fixed ports, reservoirs and channels containing and at least one fluidic network component with attached or integral magnetic object and an associated attached or integral magnetic array. Ports are defined as apertures on the exterior surface of the PFA through which a fluid (or gas) may flow. Reservoirs are defined as regions in which bulk fluid may flow along a path in at least two dimensions. Channels are defined as regions in which bulk fluid may flow along a path substantially collinear with the channel axis. At least some of the magnetic object is comprised of a ferromagnetic material. The magnetic object further has at least one degree of freedom which may be translational or rotational.

In accordance with an important feature of the invention, there is provided a base substrate comprised of at least one port and at least one reservoir.

In accordance with an important feature of the invention, there is provided at least one fluidic network component with attached or integral magnetic object on the base substrate wherein said magnetic object is comprised at least in part of a ferromagnetic material and has at least one degree of freedom.

In accordance with an important feature of the invention, there is provided a magnetic array proximate to the base substrate operable to generate a plurality of different magnetic field states at the location of at least one magnetic object on said base substrate wherein the at least one magnetic object is translated or rotated at least in part by a change from a first magnetic field state to a second magnetic field state. The magnetic array consists of at least one electromagnet. Preferably the magnetic array is a Field Programmable Analog Array (FPAA) as described in the above identified US provisional application. Other magnetic field generating means may be used.

In accordance with an important feature of the invention, there is provided a control means operable to calculate the magnetic field pattern required to translate and/or orient magnetic objects with associated fluidic network component and to generate signals that cause the calculated magnetic fields to be generated.

In accordance with an important optional feature of the invention which can be used independently with any of the above or following features, the magnetic array further provides a means to generate a spatially and/or temporally varying electric field at locations proximate to the base substrate.

In accordance with an important optional feature of the invention which can be used independently with any of the above or following features, there is provided a means to generate a transient magnetic field at the location and proximate to the location of a magnetic object and associated fluidic network component wherein the transient magnetic field changes the magnetization state of the magnetic object. The transient magnetic field may for example magnetize or demagnetize the magnetic object. The transient magnetic field may change the direction of a magnetic moment within the magnetic object.

In accordance with an important optional feature of the invention which can be used independently with any of the above or following features, the magnetic array further includes at least one ferromagnetic core wherein the ferromagnetic core may be demagnetized of magnetized in different directions by a transient magnetic field generated by the magnetic array.

In accordance with an important optional feature of the invention which can be used independently with any of the above or following features, a magnetic memory means is integral or attached to the base substrate comprised of an array of ferromagnetic material that permanently retains and maintains at least a part of the magnetic field generated by the magnetic array. The magnetic array may for example generate a sequence of magnetic fields to position and orient a plurality of fluidic network components via attached or integral magnetic objects. Proximate to the location of each magnetic object associated with a fluidic network component, the magnetic array generates a magnetic field sufficient to induce a magnetic moment that is retained by the magnetic memory means after the magnetic array is removed or inactivated. The magnetic object is retained and held at the location by the said retained magnetic moment on said magnetic memory means. The fluidic array may subsequently be reconfigured by erasing or removing the magnetic memory means.

In accordance with an important optional feature of the invention which can be used independently with any of the above or following features, there is provided a locking means that fixes fluidic network components in place. The locking means may for example be a fluid containing an adhesive that flows through the fluidic network and into joints between fluidic network components. The adhesive is subsequently hardened. The adhesive material may for example be a monomer that is hardened by photo-polymerization. The adhesive material may for example be soluble in a first solvent and insoluble in a second solvent so that adhesive dissolved in the first solvent that hardens in place as the first solvent is removed and remains in place when a second solvent is introduced. The adhesive may for example be a thermosetting adhesive.

In accordance with an important optional feature of the invention which can be used independently with any of the above or following features, there is provided a magnetic object including a means to apply an adhesive material to selected locations. The magnetic object may for example be translated to a location by a sequence of magnetic fields generated by the magnetic array and at the location release or dispense an adhesive material.

In accordance with an important optional feature of the invention which can be used independently with any of the above or following features, there is provided a magnetic object including a means to remove material from a selected location. The magnetic object may for example by translated to a location by a sequence of magnetic fields generated by the magnetic array and at the location release or dispense a solvent that dissolves material at the location. The magnetic object may for example generate and focus ultrasonic waves at a location to be cleaned. The magnetic object may for example heat and melt or vaporize material to be removed.

In accordance with an important optional feature of the invention which can be used independently with any of the above or following features, there is provided a magnetic object that includes a means to attach and detach from a fluidic network component. The magnetic object may for example be translated to a first location by a sequence of magnetic fields generated by the magnetic array, at said first location attach a fluidic network component, be translated to a second location by a sequence of magnetic fields generated by the magnetic array, and at said second location detach said fluidic network component. The attachment means may for example be a magnetically activated latch. The attachment means may for example be a thermosetting adhesive.

In accordance with an important optional feature of the invention which can be used independently with any of the above or following features, the control means further includes a sensor means operable to measure the position and orientation of magnetic objects and associated fluidic network component wherein the control means uses information from the sensor means at least in part to calculate the magnetic field pattern required to cause a change in the position or orientation of the magnetic object.

In accordance with an important optional feature of the invention, the magnetic object may be a complex magnetic object (CMO) wherein the CMO has a plurality of non-collinear magnetic moments and wherein a change in the magnetic field interacting with said magnetic moments causes a change in the orientation and position of the CMO. Preferably the domains of the magnetic moments are spatially separated such that the magnetic field at the location of a first magnetic domain is different from the magnetic field at the location of a second magnetic domain.

In accordance with an important optional feature of the invention which can be used independently with any of the above or following features, the fluidic network component is shaped and formed to retain a sample material at a location on the magnetic object. The magnetic object may for example include a cavity or a filter that retains a sample material.

In accordance with an important optional feature of the invention which can be used independently with any of the above or following features, the fluidic network component includes an attachment means to attach and retain a sample material. The attachment means may be chemical, physical or any combination of chemical and physical. For example the attachment means may include a covalent bond, a hydrogen bond, a dipole interaction, an ionic bond, an electrostatic interaction, or a Van der Waals bond. For example the attachment means may be an antibody bound to the surface of the magnetic object that retains a biological cell. For example the attachment means may be a polymer chain that becomes entangled with a sample material.

In accordance with an important optional feature of the invention which can be used independently with any of the above or following features, there is provided a physical property sensor operable to measure a physical property of the base substrate or a location proximate to the base substrate. A non-limiting list of physical property sensors includes a magnetic field sensor, an electric field sensor, an optical property sensor, a temperature sensor, a strain sensor, a pressure sensor, a pH sensor, an ionic strength sensor, a conductivity sensor. Other types of sensors may be used.

In accordance with an important optional feature of the invention which can be used independently with any of the above or following features, at least one location the base substrate includes a thermal control device that changes the temperature of material proximate to the location. The thermal control device may for example be a resistor that generates heat or a Peltier cooler.

In accordance with an important optional feature of the invention which can be used independently with any of the above or following features, at least one location the base substrate includes an electrically conductive path from the magnetic array to a magnetic object at said location and the magnetic object includes a device that draws at least some electric power through the conductive path.

In accordance with an important optional feature of the invention which can be used independently with any of the above or following features, the fluidic network component includes a piezo-electric member that changes shape when electrical power is applied.

In accordance with an important optional feature of the invention which can be used independently with any of the above or following features, the fluidic network component includes an integral channel or an integral aperture.

In accordance with an important optional feature of the invention which can be used independently with any of the above or following features, a first fluidic network component is designed and shaped to interlock with a second fluidic network component.

In accordance with an important optional feature of the invention which can be used independently with any of the above or following features, a fluidic network component is designed and shaped to cause fluid flow tangent to an axis when said magnetic object is rotated about said axis. The fluidic network component may for example have a plurality of blades that impart momentum to liquid between adjacent blades.

In an important embodiment that may be used in combination with any of the preceding or following embodiments, the magnetic field generating means is operated to translate a magnetic object to a selected location on the base substrate. The magnetic field generating means may further operate to orient a magnetic object relative to a feature of the base substrate. For example, the control means may generate as sequence of magnetic fields that translate a magnetic object and associated fluidic network component to an intersection of two channels on the base substrate and orient an aperture integral to the fluidic network component along the axis of a first channel. The fluidic network component so oriented blocks flow along the axis of the second channel.

In an important embodiment that may be used in combination with any of the preceding or following embodiments, a magnetic object and associated fluidic network component is translated along a channel and the translation changes the pressure of a liquid or gas in the channel. The fluidic network component may be operated for example as a piston pushing liquid along a channel.

In an important embodiment that may be used in combination with any of the preceding or following embodiments, a magnetic object is rotated about an axis within a fluidic network component and said rotation imparts momentum to a liquid within said fluidic network component. The fluidic network component may for example be a rotary pump rotor. The fluidic network component may for example be an auger.

In an important embodiment that may be used in combination with any of the preceding or following embodiments, a fluidic network component changes the pressure of liquid proximate by changing shape. The fluidic network component for example may include a piezoelectric member that changes shape and generates a pressure wave. The frequency of the pressure wave may be chosen for example to disrupt a cell membrane, to mix reactants, or to cause peristaltic motion of fluid.

In an important embodiment that may be used in combination with any of the preceding or following embodiments, the fluidic network component is positioned and oriented by associated magnetic objects to change at least one property of a fluid flow. For example a fluidic network component may be positioned in a micro-fluidic channel to block flow in a first orientation perpendicular to a channel wall and to pass flow in a second orientation parallel to a channel wall. For example a fluidic network component may be positioned at the intersection of a plurality of channels and by changing orientation select a first channel fluid flows from and a second channel fluid flows to. In some embodiments, the fluidic network component may include an orifice along a first axis wherein fluid flows through the orifice if the fluidic network component is in a first orientation in a channel and fluid does not flow through the orifice if the fluidic network component is in a second orientation.

In an important embodiment that may be used in combination with any of the preceding or following embodiments, the base substrate includes a mold region and magnetic objects are directed into the mold region to act upon a deformable material in the mold region. The deformable material may for example be a molten thermoplastic or a resin. The magnetic object may for example exert a force on the deformable material causing the deformable material to flow and change shape. The magnetic object may for example be an impeller or a piston that causes deformable material to flow into the mold region. This embodiment may be used for example to direct deformable material into recesses of the mold. The magnetic object may be retained within the mold region or withdrawn.

In some embodiments, the shape of the deformable material in the mold region is measured by a detector; the measured shape is compared with a desired shape; and the magnetic object is moved so as to minimize the difference between the measured and desired shapes. In some embodiments, the stress in the material is measured and the magnetic object is moved to generate or relieve stress. In polymer materials, stress changes bond lengths and angles and these changes are readily measured by Raman spectroscopy.

In an embodiment that may be used in combination with any of the preceding or following embodiments, a deformable material is extruded from a port on the base substrate and a magnetic object is moved within the deformable material. For example, the extruded material may be a glass tube and the magnetic object is positioned within the tube and moved to generate a variable pitch spiral indentation on the inner wall of the tube. In another example, the magnetic object is moved to generate a lens integral to the extruded tube wall to focus light at a point inside the tube. In another example, the inner wall of a tube is patterned by the magnetic object to create turbulent flow within the tube and mix reagents.

DETAILED DESCRIPTION

Figure 1:
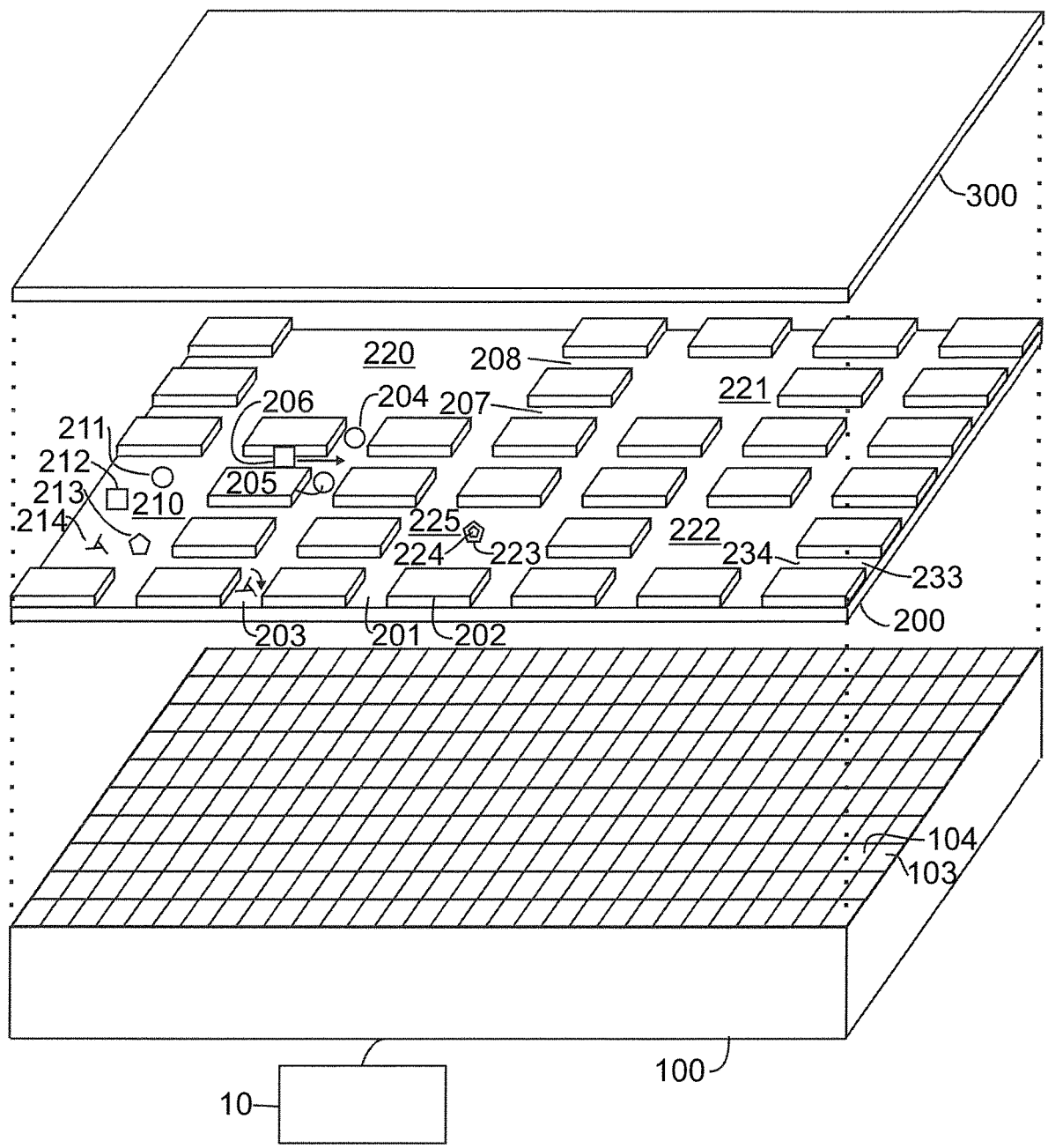
FIG. 1 shows an expanded view of a programmable fluid array.

FIG. 1 shows an expanded view of a programmable fluid array of the invention. For illustrative purposes three basic layers are shown: a magnetic array 100, a fluidic array 200, and a cover plate 300. A simple embodiment of the invention may be the three layers as shown. However, in general the magnetic components represented as layer 100 and the fluidic components represented as layer 200 are interpenetrating three dimensional networks as better shown in FIG. 2.

Magnetic array 100 includes a plurality of electromagnets 103 controlled by control means 10. The magnetic array may be a fixed array of conductive coils that are activated in combination to produce a desired magnetic field at a location within and proximate to base substrate 200. Preferably the magnetic array a field programmable analog array as described and shown in FIG. 2 of the above identified application.

Base substrate 200 includes a plurality of ports 201 that permit the flow of a liquid or gas between the fluidic array and an external source or sink. Ports 201 and channels 207 are separated one from the next by blocks of substrate material 202. Base substrate includes a reservoir of fluidic network components 210 of different types 211, 212, 213 and 214. In operation, a user may configure the fluidic array by translating one or more fluidic network component from the reservoir region 210 to a different location in the fluidic array where the fluidic network component performs a function.

A selected fluidic network component may be translated within the fluidic array by a sequence of magnetic fields generated by magnetic array 100 interacting with magnetic moment(s) of the associated magnetic objects to generate net forces and torques. A first magnetic field in a sequence may for example be generated by control 10 causing electric current to flow in electromagnet 103 generating a first magnetic field proximate to electromagnet 103 in adjacent base substrate region 233. A second magnetic field in a sequence may for example be generated by control 10 causing electric current to flow in electromagnet 104 generating a second magnetic field proximate to electromagnet 104 in adjacent base substrate region 234. At least a part of a magnetic object includes a ferromagnetic material that sustains an induced or permanent magnetic moment. Hence a magnetic object and associated fluidic network component is be attracted to location 233 by the first magnetic field and attracted to location 234 by the second magnetic field via induced magnetic moments. If a magnetic object has one or more permanent magnetic moments, the direction of the resulting force depends upon the direction of the magnetic field relative to the magnetic moment(s). The scale of the magnetic array is preferably approximately commensurate with the scale of the fluidic array such that the magnetic field generated for example in channel region 207 is different from the magnetic field generated in neighboring channel region 208.

As shown at 203, a fluidic network component of type 214 from fluidic network component reservoir 210 may be translated to a functional position in a fluidic channel by the application of a sequence of magnetic fields along the pathway. As shown at 204 and 205, fluidic network components are positioned in two channels at an intersection of channels to block flow in two directions. Fluidic network components at 204 and 205 may be held in position by magnetic fields generated at proximate locations in magnetic array 100. Preferably, magnetic array momentarily generates magnetic field sufficient to induce a permanent magnetic moment in a ferromagnetic material proximate to magnetic objects 204 and 205 and said permanent magnetic moment retains magnetic objects and associated fluidic network component in position without application of additional electric power to the magnetic array. At a subsequent time, the magnetizing field may be reversed to erase the permanent magnetic moment and allow fluidic network components 204 and 205 to be translated to different locations by sequences of magnetic fields generated by magnetic array 100. As shown at 206, a fluidic network component may be translated along a channel as a piston causing a fluid in the channel to flow. The flow in this case may be localized to a small region of the fluidic array and importantly, the flow does not depend upon the application of external hydrostatic pressure. Fluid flow may be generated where needed.

Region 220 in the fluidic array is a prototyping area that may be configured to direct and process fluids using fluidic network components taken from fluidic network component reservoir 210. Custom configuration of region 220 is illustrated in more detail in FIG. 3. Base substrate 200 may include a plurality of chambers 221, 222 and 225 with differing dimensions. Chambers 221 and 222 may be reservoirs for samples and reagents, respectively. Chamber 225 includes a fluidic network component 223 connected to a power supply 224. Fluidic network component 223 may for example be a piezo electric ultrasonic generator. The ultrasonic generator may be used for example to mix reagents and samples added to chamber 225 by flow induced as shown at 206. The ultrasonic generator may for example be tuned to a frequency resonant with a cell membrane, thereby disrupting the cell membrane. The ultrasonic generator may for example be used to clean a selected channel or chamber after use.

Figure 2:
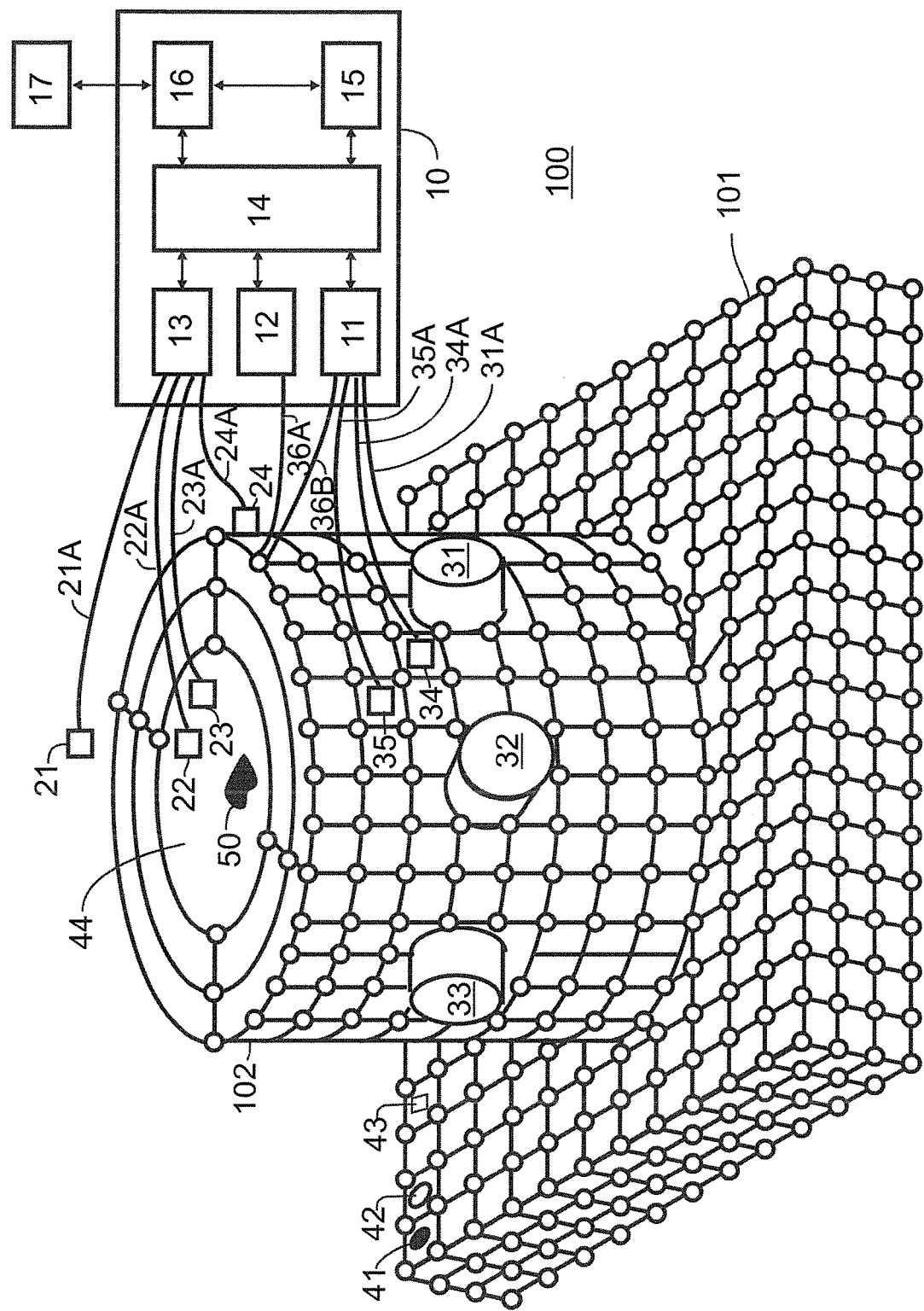
FIG. 2 illustrates an array of conductive segments connected at nodes. This figure is taken from FIG. 1 of the application case 15P defined above.

FIG. 2 shows an expanded view of the preferred magnetic array 100, which minimally includes a spatial array of conductive segments 101 and 102, and a control means 10. The spatial array may include regions with different types of ordering that range from regular to random. For illustrative purposes a region with orthogonal ordering is shown at 101 and a region that has cylindrical ordering is shown at 102.

As illustrated the cylindrical region is comprised of three layers in a radial direction, and the orthogonal region is comprised of four layers in the vertical direction for illustrative purposes only. A practical device of the invention may have as few as one layer or more than one million layers in any given direction. Other types of ordering based on space groups, Penrose patterns, fractal geometry and random walks are possible. In general, it is convenient to use a spatial array with the same symmetry characteristics as the electromagnetic fields it is intended to generate or interact with.

The control means 10 comprises a computation means 14 in communication with an analog output port 11, a logical output port 12, an input port 13, a machine readable storage means 15 and a communication means 16. Computation means 14 may for example be a digital processing unit such as a CPU or an FPGA. Computation means 14 may include an analog processing unit. Analog output port 11 functions to distribute electrical power to devices within the spatial array. As illustrated in FIG. 1, the analog output port supplies electrical power to fixed electromagnetic coil 31 via cable 31A. As shown, fixed magnets 31, 32 and 33 are spaced at even intervals around a portion of the spatial array and may be electromagnets, as shown by the connection to power at 31A, permanent magnets, or a combination of permanent and electromagnets. In operation, the fixed magnets function to provide strong magnetic fields and the surrounding spatial array of conductive segments functions to produce magnetic fields that modify or trim the magnetic fields produced by fixed magnets. Analog output 11 is connected by cable 34A to a thermal regulation device shown symbolically at 34 integral to the spatial array. The thermal regulation device in this example may be a thermoelectric (Peltier) cooler or a resistive heater. The spatial array may contain a plurality of thermal regulation devices that function to hold different regions of the spatial array at different temperatures. A radiation source integral to the spatial array is shown symbolically at 35 connected with analog output 11 by cable 35A. The radiation source may for example be a laser, a LED, a thermal blackbody infrared source, a gas discharge tube, an x-ray generator, an ion gun or a microwave generator.

As shown at 36, a node may receive analog power from analog output 11 via cable 36B. The fixed Analog output port 11 may include voltage and current regulation circuits, digital to analog converters, amplifiers, filters, and the like for each output channel. Analog output port 11 may distribute constant electrical power to a first connected device and a time varying waveform to a second connected device. Logical output port 12 functions to transmit logic signals to devices in the spatial array such as nodes and sensors. As shown at 36, a node may receive logic signals via cable 36A from logic output 12. Input port 13 accepts digital and analog signals from sensor devices integral to or proximate to the spatial array. For example radiation sensor 21 may include an analog to digital converter (ADC) and transmit a digital signal to input port 13 by cable 21A or radiation sensor may transmit an analog signal to input port 13 and the analog signal may be converted to a digital format by an ADC integral to the input port. Alternately as discussed in U.S. provisional application 62/767,186 filed Nov. 14, 2018 by the current inventors, very high speed data analysis of analog waveforms from radiation detector 21 may be carried out with analog circuits. Control means 10 may exchange information with an external device 17 via communication means 16. External device 17 is the interface between the user and the arrangement of the invention. External device 17 may include a computation device, a display device, an input device, a data storage device, a network connection, or any combination thereof.

Computation device 14 takes as input desired electromagnetic fields in a set of regions within or proximate to the spatial array and outputs a set of selected conductive segments and electrical power values (which may be zero) associated with each selected conductive segment that produces the closest approximation to the set of desired electromagnetic fields. The desired electromagnetic fields may be actively generated by the spatial array by applying power to at least one conductive segment or passively generated by forming a conductive path between at least two conductive segments that interact with an externally applied electromagnetic field. The computation means models electromagnetic fields produced by the spatial array based on the geometry and electrical properties of materials comprising the spatial array including nodes, conductive segments, logic signal lines, and surrounding materials and voids. It should be noted that the properties of electronic components in nodes together with electromagnetic fields produced by logic signals to nodes are explicitly included in the model.

That is the computation means calculates the electromagnetic fields generated by logic signals supplied to nodes within the spatial array and adjusts the electrical power supplied to conductive segments to compensate for this effect. Once the geometry and material properties are specified, the electromagnetic fields can be calculated by solving Maxwell's equations. For example Maxwell's equations may be approximated as a system of linear equations applied over sufficiently small volume elements and the system of linear equations can be solved by standard matrix algebra. In another example, Maxwell's equations may be solved iteratively over a grid. In another example, Maxwell's equations can be solved with a neural network. Any method that solves Maxwell's equations may be used. The method used to solve Maxwell's equations is not part of the invention.

Optionally the spatial array includes electric field sensor 22 in communication with control means 10 by cable 22A. Optionally the spatial array includes magnetic field sensor 23 in communication with control means 10 by cable 23A. The computation means may use information from electric and magnetic field sensors embedded in the spatial array or proximate to improve its model of electromagnetic fields generated for given sets of connections and power levels among conductive segments. For example, the dimensions of a manufactured spatial array may differ from an ideal specification and consequently the calculated electromagnetic fields differ from measured electromagnetic fields. Optionally the spatial array includes temperature sensor 24 in communication with control means 10 by cable 24A. For example, the material properties may vary with temperature and environmental factors such as humidity. For example, the material properties may change over time due to atomic diffusion or chemical reactions such as oxidation. The computation device 14 may use sensor measurements to improve its model and thereby reduce the difference between a desired electromagnetic and the measured electromagnetic field at each time instant.

The spatial array may include a ferromagnetic material occupying a portion of the volume between conductive segments of the spatial array as indicated schematically at 41. The ferromagnetic material functions to modify the magnetic field proximate to the ferromagnetic material. The spatial array may include dielectric material occupying a portion of the volume between conductive segments of the spatial array as indicated at 42. The dielectric material functions to modify the electric field to the dielectric material. The spatial array may include optical pathways occupying a portion of the volume between conductive segments of the spatial array as indicated at 43. The optical pathways may for example be voids filled with a gas or fiber optics. The spatial array may include channels occupying a portion of the volume between conductive segments of the spatial array as indicated at 44. The channels 44 may include a test material 50 that is acted upon by electromagnetic fields generated by or modified by the spatial array. One or more of the plurality of channels 44 may have a ferromagnetic or dielectric liquid injected or removed at different times to modify the electromagnetic field proximate to that channel.

The spatial array may include a plurality of channels 44. The plurality of channels 44 may for example form an array of similar channels for processing sample objects such as cells in parallel. The plurality of channels 44 may for example form a network wherein the path taken by a test object in the network is regulated by electromagnetic fields generated by the spatial array. The network of channels may include for example gates that regulate flow of a gas or liquid within a channel in response to changes in the electromagnetic field generated at the gate location by the spatial array. A gate object may for example be moved from a first location to a second location by electromagnetic forces generated by the spatial array.

In application, the desired electromagnetic field at a set of locations may be specified directly by a user or the set of desired electromagnetic fields may be generated by another process as those required to have a desired effect on a material within or proximate to the spatial array. For example, in Provisional Application 62/969,983 filed Feb. 4, 2020 by the present inventors, the required forces on a magnetic object are determined by a dynamical calculation and the required electromagnetic fields are calculated from the required forces and properties of the magnetic object.

Figure 3:
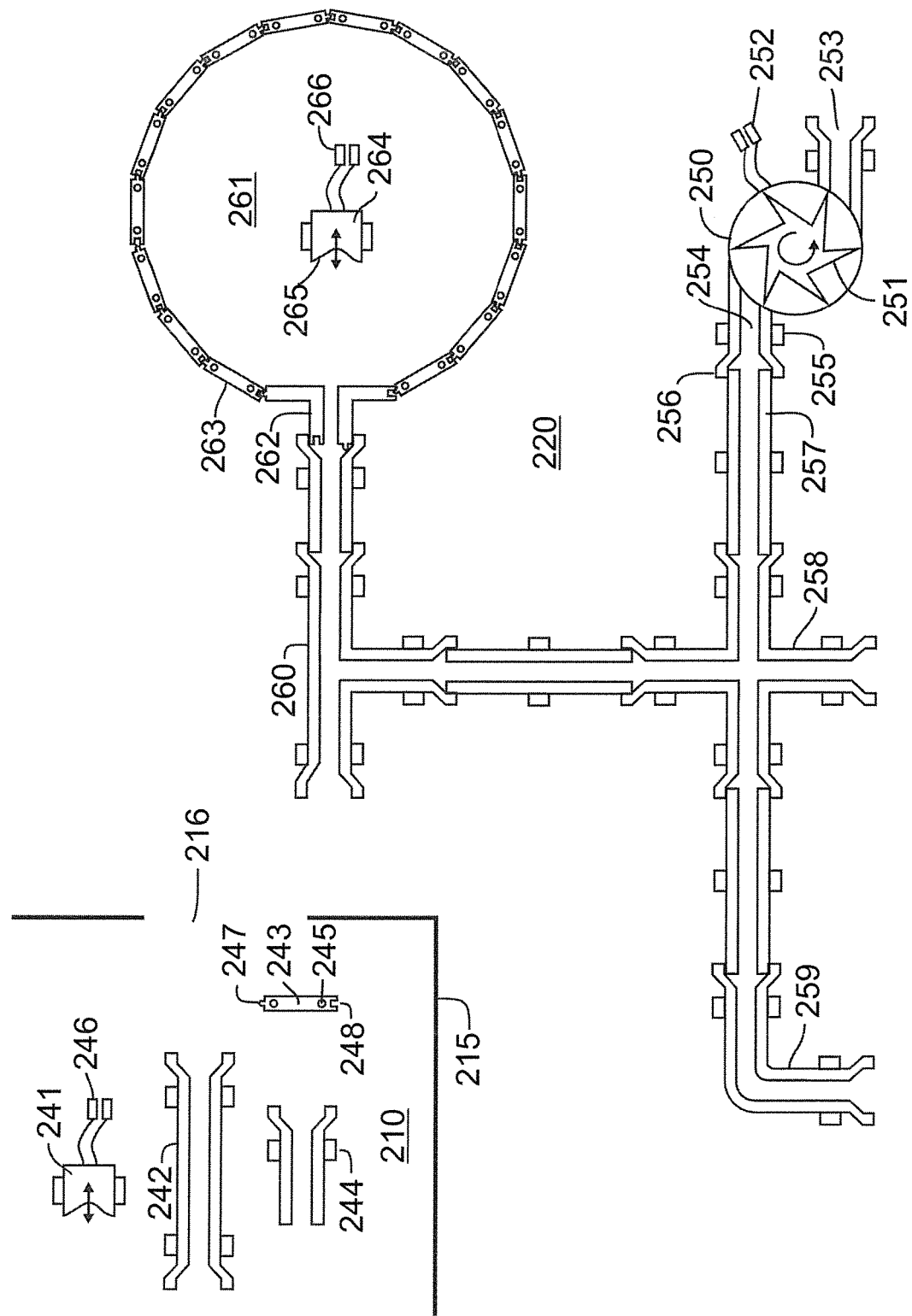
FIG. 3 shows a detailed view of a free assembly region.

FIG. 3 shows an expanded view of prototyping area 220 separated from adjacent magnetic object reservoir 210 by wall 215 with port 216. Fluidic network component reservoir 210 may contain active magnetic objects 241 that include electrical power connection 246 and passive fluidic network components such as channel section 242 and wall section 243. The fluidic network components include a region of ferromagnetic material 244 shown as tabs for illustrative purposes, but may be integral to the fluidic network component structure as shown at 245. Many shapes of fluidic network components may be used to channel and process fluids in the programmable fluid array. The types of functions fluidic network components may be used for includes blocking flow, regulating flow, filtering objects such as cells from a fluid flow, combining flows along a plurality of paths onto a single path, dividing flow along one path into flow along a plurality of paths, mixing fluids, diverting flow from a first path to a second path, generating a pressure gradient to cause flow, lubricating a path, and cleaning a path. The types of magnetic objects shown are for illustration and are not limiting to the scope of the invention.

As shown at 250, a fluidic network component may be a rotary pump with rotor 251 driven by power via electrical contacts 252. Fluid enters from a chamber (not shown) at 253 and is discharged at 254. The pump object 250 is held in place by ferromagnetic material indicated at 255 that interacts with a generated or static magnetic field to retain position. Discharge 254 includes a flared flange section 256 that joins with a straight channel section 257. Straight channel sections 257 may be linked in an alternating pattern with flanged sections 242 to form a channel of any length.

The fluidic network includes a cross intersection 258, an elbow section 259 and a tee section 260. Any combination of channel sections may be assembled (and disassembled) to produce a custom fluid network by using a sequence of magnetic fields to move each piece into position.

As shown at 261, a chamber of any size may be assembled using fluidic network components of type 243 together with associated magnetic objects 245 that have loosely interlocking sections as best illustrated at 247 and 248. There may be small gaps between the fluidic network components, provided that the liquid surface tension is sufficient to overcome the fluid pressure over the gap region. The custom chamber is fashioned with a combination of angled fluidic network components 262 and straight fluidic network components 263 of type 243. The chamber includes an ultrasonic generator 264 with moving diaphragm 265 drawing electrical power at 266. The prototyping region may include a plurality of locations with electrical contacts that a fluidic network component may be placed on to draw power. Control means 10 causes the electrical contacts to be powered only when associated with an appropriate fluidic network component. Control 10 may assemble fluidic network components 262, 263 and 264 in prototype region 220 by generating control signals that cause magnetic array 100 to produce a sequence of magnetic fields that interact with magnetic objects associated with each fluidic network component generating forces and torques that transport each fluidic network component from storage region 210 to a desired position and orientation in prototype region 220.

Figure 4:
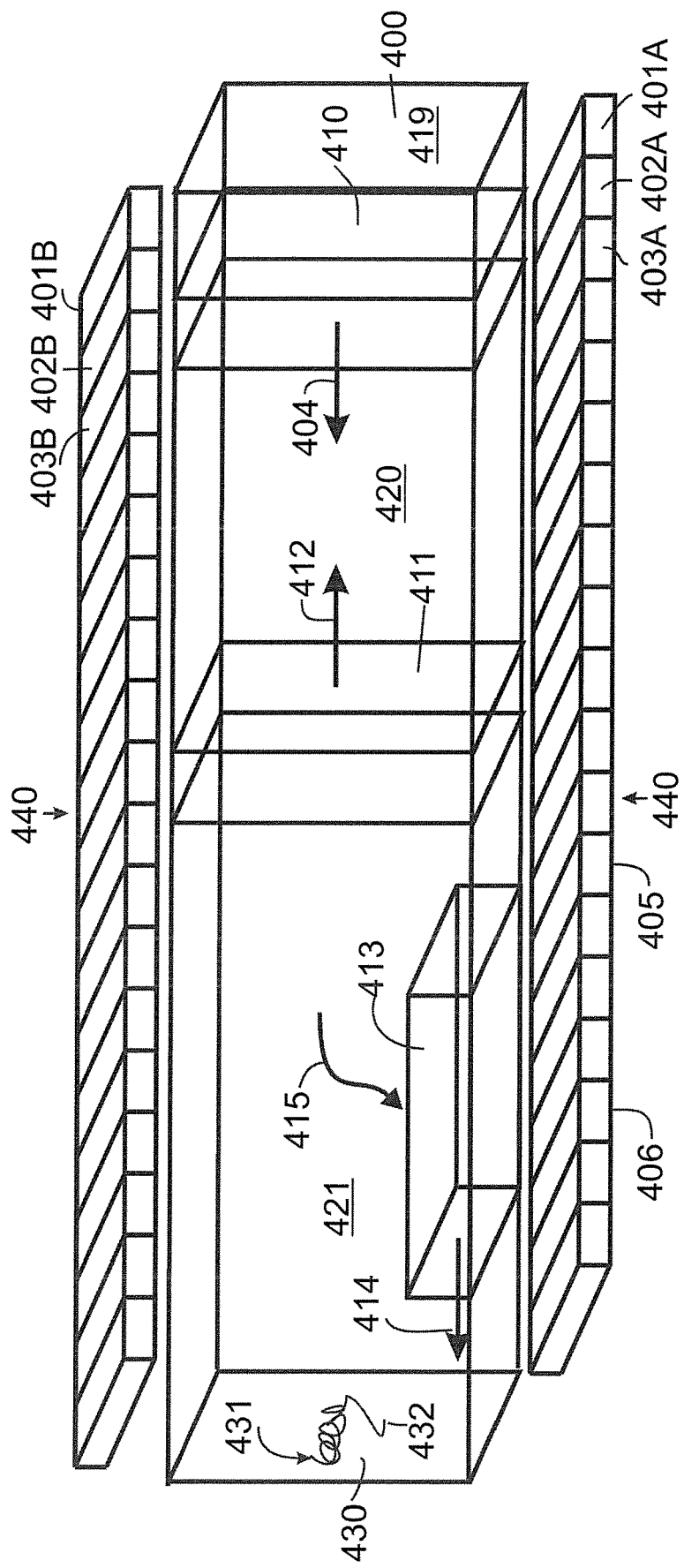
FIG. 4 shows a detailed view of a magnetic object oriented in a channel.

FIG. 4 shows an expanded view of a channel 400 with magnetic array 440 which may be a portion of magnetic array 100 shown in FIG. 2. Fluidic network component 410 is oriented perpendicular to the axis of channel 400 by activating elements of magnetic array 440 thereby blocking flow of a liquid or gas between regions 419 and 420. Fluidic network component 410 is oriented by the magnetic field generated between magnets 401A and 401B and may by translated in the direction shown at 404 by activating the magnet pairs 401 (A&B), 402 (A&B), and 403 (A&B) in a sequence. The process may be repeated along the length of the magnetic array. The motion of magnetic object 410 may act as a piston to force fluid in region 420 to flow in the direction 404. In another embodiment, a second fluidic network component 411 is translated in opposite direction 412 in channel 400 and fluid in the region 420 is pressurized. In another embodiment, fluidic network component 413 is oriented along the channel wall by for example generating a magnetic field polarized between magnet elements 405 and 406 allowing flow in the channel region 421. Fluidic network component 413 may be translated along the channel as shown at 414 generating a traveling pressure wave in region 421 thereby causing peristaltic flow. Fluidic network components may be switched between vertical alignment as shown at 410 (closed) and horizontal alignment (open) as shown at 413 along path 415 to act as a gate valve.

As shown at 430, the wall of channel 400 may include a lubricating block co-polymer comprised of anchor region 431 that sticks to the channel wall and a head region 432 that extends into the channel. The anchor region may for example include a polar polymer such as PEO and the head region may for example include non-polar aliphatic chains.

Figure 5:
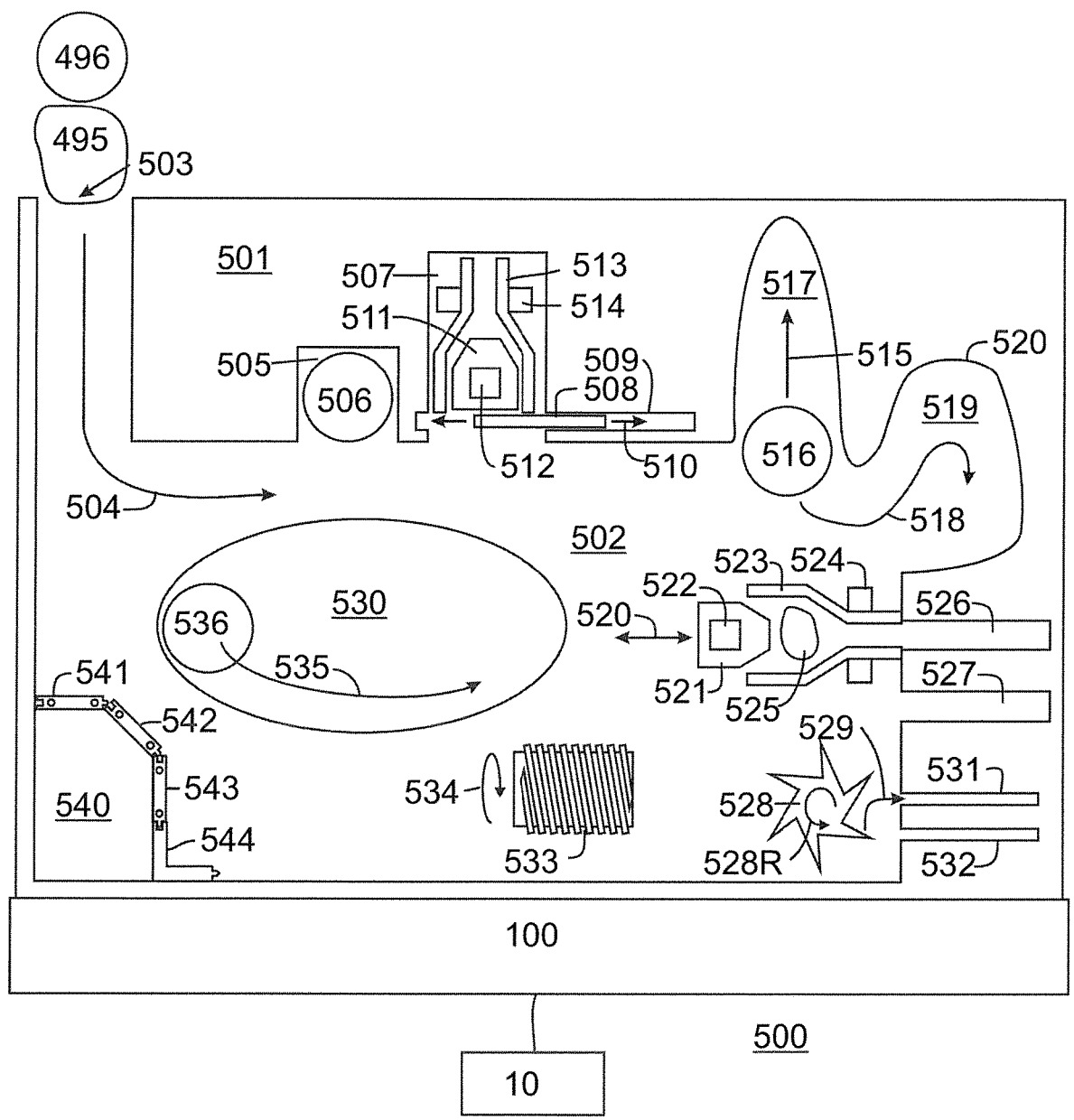
FIG. 5 shows a detailed view of an injection molding system based on a programmable fluid array of the invention.

FIG. 5 shows an injection molding system using a programmable fluid array of the invention generally indicated at 500. The injection molding system includes a mold frame 501 with a shaped cavity 502. Mold frame 501 is proximate to or integral with magnetic array 100 in communication with control means 10.

In some embodiments the shaped cavity 502 conforms to the shape of a molded object and the features of the programmable fluid array are used to improve the speed and accuracy of the injection molding process. In some embodiments, features of the programmable fluid array additionally modify the shape and form of a molded object.

Material to be molded 495 is injected into mold cavity 502 through port 503 along path 504. In some embodiments the material to be molded 495 includes one or more magnetic objects 496. Magnetic objects 496 follow a path through mold cavity determined at least in part by a sequence of magnetic fields. Magnetic object 496 exerts a force on molding material 495 that modifies molding material 495. Magnetic object 496 may alter the spatial distribution of molding material 495. Magnetic object 496 may alter a property of molding material 495 such as stress, composition or crystal orientation. In some embodiments magnetic object remains within and integral to the molded object. In other embodiments magnetic object 496 is extracted prior to molding material 495 setting.

Mold cavity may include secondary recess 505 sized to contain one or more magnetic objects 506. Magnetic objects 506 may be transported by a sequence of magnetic fields from secondary recess along user specified paths within mold cavity 502 to perform an operation during the molding process and return to secondary cavity before the end of the molding process. The finished molded object does not include the secondary recess volume 505, but may include a surface mark at the location of recess 505 as material is parted in the mold release process.

Mold cavity may include an enclosed secondary recess 507 with gate 508 movable in slot 509 as shown at 510. In this embodiment, gate 508 opens prior to or during the injection of molding material and magnetic objects contained therein are transported by a sequence of magnetic fields into mold cavity 502 to perform an operation. After the operation and prior to molded object parting, the magnetic objects are returned to secondary recess 507 and gate 508 is closed. During molded object separation, gate 508 protects magnetic objects and provides a parting surface for molded object removal. As shown, secondary recess contains plunger fluid network component 511 with integral magnetic object 512 and funnel fluid network component 513 with attached magnetic object 514.

Mold cavity 502 includes cavity regions 517 and 519. Due to the narrow entrance, high pressure would normally be required to overcome the viscosity of mold material 495 allowing material to flow into and fill cavities 517 and 519. As shown at 515, magnetic object 516 may be directed into cavity 517 generating local compressive forces causing mold material 495 to flow into cavity 517. As shown at 518, magnetic object may be directed along a path generally following the contour of cavity 519 generating pressure on mold material between magnetic object 516 and cavity wall 520 causing said mold material to flow into cavity 519. The local pressure generated by the motion of magnetic object 516 reduces the injection pressure required at port 503.

Mold cavity 502 includes narrow cavities 526 and 527. As shown, funnel fluidic network component 523 is positioned proximate to the entrance of cavity 526 and held in position by interaction of integral magnetic object 524 and a magnetic field applied by magnetic array 100. Plunger fluidic network component 521 is positioned relative to the mouth of funnel component and is movable as shown at 520 by a sequence of magnetic fields generated by magnetic array 100 interacting with integral magnetic object 522. Movement of plunger 521 into funnel 523 generates pressure on a volume element of molding material 525 forcing said material into cavity 526. The local pressure generated on volume element 525 reduces the injection pressure required at port 503. After cavity 526 is filled with molding material, plunger 521 and funnel 523 may be translated by a sequence of magnetic fields to align with cavity 527, repeating the filling process at cavity 527 and possibly subsequent cavities. At the conclusion of the process, plunger 521 and funnel 523 may be returned to a secondary recess 505 or 507 for reuse or alternately become integral to a finished molded object.

As shown at 528, an impeller may be rotated as shown at 528R proximate to narrow cavities 531 and 532 generating a flow of molding material into cavities 531 and 532. The impeller in this case is a complex magnetic object with a plurality of integral magnetic moments that interact with magnetic fields produced by magnetic array 100 under the control of control means 10. Alternately a screw impeller as shown at 533 rotating as shown at 534 may be used in the place of impeller 528. Screw impeller may also operate to generate an internal spiral pattern in the mold material.

Molded objects may include an internal void as shown at region 530. During the injection process a magnetic object 536 may be directed on a peripheral path of the desired void region as shown at 535 resisting the flow of mold material into the void region. In the conventional method voids are generated by injecting gas and the shape of the void conforms to the general shape of the mold cavity. With the magnetic object 536 providing pressure instead of a gas, more design options are available for void shape and location. For example, the void may be internal with no connection to an external gas source.

As shown at region 540 of mold cavity 502 fluidic network components 541, 542, 543 and 544 are held in place by magnetic forces and prevent mold material 495 from flowing into region 540. That is the shape of the mold cavity may be modified by fluidic network components for customization parts, thereby avoiding the expense of fabricating a custom mold. In some embodiments, the mold cavity may be fabricated within a prototyping area 220 entirely with fluidic network components. This embodiment allows rapid prototyping of molded parts.

The invention claimed is:
1. A method for processing a fluid comprising the steps of
defining a fluid network through which the fluid passes, the fluid moving through the fluid network defined by network components which engage the passing fluid and control a path of the fluid;
providing in the fluid network at least one of the network components which is a movable fluidic network component, a position and/or orientation of which controls the path of the fluid through the fluid network;
attaching to said at least one movable fluidic network component at least one included magnetic object;
applying a sequence of magnetic fields using a magnetic array to said at least one the movable fluidic network component;
wherein said magnetic fields interact with the included magnetic object to produce a force on the movable fluidic network component;
and thereby causing movement of said at least one movable fluidic network component by translation and/or rotation from a first location and/or orientation to a second location and/or orientation in the fluid network to modify the fluid network.

2. The method according to claim 1 wherein the magnetic object is integral to said at least one movable fluidic network component.

3. The method according to claim 1 wherein the magnetic object is joined with said at least one movable fluidic network component at the first location and/or orientation and in the second location and/or orientation the magnetic object is removed from said at least one movable fluidic network component.

4. The method according to claim 1 wherein the fluid network includes a plurality of pre-formed channels and at least one property of at least one of said pre-formed channels is changed by the movement of said at least one movable fluidic network component.

5. The method according to claim 1 wherein the fluid network further includes a magnetic memory component and a magnetic moment is induced at a location on said magnetic memory component wherein the magnetic moment holds and retains said at least one movable fluidic network component at said location.

6. The method according to claim 1 wherein the fluid network further includes a reservoir that contains said at least one movable fluidic network component.

7. The method according to claim 1 wherein said at least one movable fluidic network component comprises a plurality of the movable fluidic network components which are connected together in a prototype region of the fluid network.

8. The method according to claim 1 wherein, subsequent to said movement of said at least one movable fluidic network component providing a configuration of the fluid network, an adhesive material is added to said at least one movable fluid network component.

9. The method according to claim 1 wherein said at least one movable fluidic network component comprises first and second movable fluidic network components and wherein a portion of said first movable fluidic network component is interlocked with a portion of said second fluidic network component.

10. The method according to claim 1 wherein subsequent to said movement of said at least one movable fluidic network component, the magnetic array is removed.

11. The method according to claim 1 further comprising removing material from at least one location in the fluid network by a movable removing component including a magnetic object.

12. A method for processing a fluid comprising the steps of
defining a fluid network through which the fluid passes, the fluid moving through the fluid network defined by network components which engage the passing fluid and control a path of the fluid;
providing in the fluid network at least one of the network components which is a movable fluidic network component, a position and/or orientation of which controls the path of the fluid through the fluid network;
attaching to said at least one movable fluidic network component at least one included magnetic object;
applying a sequence of magnetic fields using a magnetic array to said at least one movable fluidic network component;
wherein said magnetic fields interact with the included magnetic object to produce a force on the movable fluidic network component and thereby cause movement of said at least one movable fluidic network component from a first condition to a second condition in the fluid network to modify the fluid network;
wherein said at least one movable fluidic network component draws electric power from the fluid network to perform an operation on said fluid.

13. The method according to claim 1 wherein said at least one movable fluidic network component operates to change a pressure of at least a portion of said fluid.

14. The method according to claim 1 wherein said at least one movable fluidic network component mixes two liquids in said fluid.

15. The method according to claim 1 wherein said at least one movable fluidic network component filters a material from a liquid in said fluid.

16. A method for processing a fluid comprising the steps of
defining a fluid network through which the fluid passes, the fluid moving through the fluid network defined by network components which engage the passing fluid and control a path of the fluid;
providing in the fluid network at least one of the network components which is a movable fluidic network component, a position and/or orientation of which controls the path of the fluid through the fluid network;
attaching to said at least one movable fluidic network component at least one included magnetic object;
applying a sequence of magnetic fields using a magnetic array to said at least one movable fluidic network component;
wherein said magnetic fields interact with the included magnetic object to produce a force on the movable fluidic network component and thereby cause movement of said at least one movable fluidic network component;
wherein said fluid network comprises an injection molding system including a mold frame with a shaped cavity for forming a molded object from a molding material therein.

17. The method according to claim 16 wherein said fluid network and said at least one movable fluidic network component act to improve the speed and accuracy of the injection molding system and/or to additionally modify the shape and form of said molded object.

18. The method according to claim 16 wherein said at least one movable fluidic network component follows a path through the shaped cavity determined at least in part by said sequence of magnetic fields and exerts a force on said molding material therein.

19. The method according to claim 16 wherein said magnetic object of said movable fluidic network component remains within and integral to the molded object or is extracted prior to setting of the molding material.

20. The method according to claim 16 wherein said at least one movable fluidic network component is transported by said sequence of magnetic fields from a secondary cavity along a path within the shaped cavity to perform an operation during a molding process of the molding system and is returned to the secondary cavity before an end of the molding process.

21. The method according to claim 16 wherein said at least one movable fluidic network component is directed into a cavity generating local compressive forces causing mold material to flow into the cavity.

22. The method according to claim 16 wherein said at least one movable fluidic network component is used to modify the shape of the mold cavity.

23. The method according to claim 1 wherein there is further provided a sensor operable to measure the position and orientation of said at least one movable fluidic network component where information from the sensor is used to calculate the magnetic field pattern required to cause a change in the position or orientation of said movable fluidic network component.

24. The method according to claim 1 wherein at least one movable fluidic network component includes a piezo-electric member.

25. A method for processing a fluid comprising the steps of
defining a fluid network through which the fluid passes, the fluid moving through the fluid network defined by network components which engage the passing fluid and control a path of the fluid;
providing in the fluid network at least one of the network components which is a movable fluidic network component, a position and/or orientation of which controls the path of the fluid through the fluid network;
attaching to said at least one movable fluidic network component at least one included magnetic object;
applying a sequence of magnetic fields using a magnetic array to said at least one movable fluidic network component;
wherein said magnetic fields interact with the included magnetic object to produce a force on the movable fluidic network component and thereby cause movement of said at least one movable fluidic network component from a first condition to a second condition in the fluid network to modify the fluid network;
wherein said movable fluidic network component in the second condition acts to block or regulate flow of the fluid.

26. The method according to claim 25 wherein the magnetic object is integral to said at least one movable fluidic network component.

27. The method according to claim 25 wherein the magnetic object is joined with said at least one movable fluidic network component at the first location and/or orientation and in the second location and/or orientation the magnetic object is removed from said at least one movable fluidic network component.

28. A method for processing a fluid comprising the steps of
defining a fluid network through which the fluid passes, the fluid moving through the fluid network defined by network components which engage the passing fluid and control a path of the fluid;
providing in the fluid network at least one of the network components which is a movable fluidic network component, a position and/or orientation of which controls the path of the fluid through the fluid network;
attaching to said at least one movable fluidic network component at least one included magnetic object;
applying a sequence of magnetic fields using a magnetic array to said at least one movable fluidic network component;
wherein said magnetic fields interact with the included magnetic object to produce a force on the movable fluidic network component and thereby cause movement of said at least one movable fluidic network component from a first condition to a second condition in the fluid network to modify the fluid network;
wherein said movable fluidic network component in the second condition acts to split fluid flow from one path portion of said path to a plurality of path portions of said path.

29. The method according to claim 28 wherein the magnetic object is integral to said at least one movable fluidic network component.

30. The method according to claim 28 wherein the magnetic object is joined with said at least one movable fluidic network component at the first location and/or orientation and in the second location and/or orientation the magnetic object is removed from said at least one movable fluidic network component.

31. A method for processing a fluid comprising the steps of
defining a fluid network through which the fluid passes, the fluid moving through the fluid network defined by network components which engage the passing fluid and control a path of the fluid;
providing in the fluid network at least one of the network components which is a movable fluidic network component, a position and/or orientation of which controls the path of the fluid through the fluid network;
attaching to said at least one movable fluidic network component at least one included magnetic object;
applying a sequence of magnetic fields using a magnetic array to said at least one movable fluidic network component;
wherein said magnetic fields interact with the included magnetic object to produce a force on the movable fluidic network component and thereby cause movement of said at least one movable fluidic network component from a first condition to a second condition in the fluid network to modify the fluid network;
wherein said movable fluidic network component in the second condition acts to join a plurality of fluid path portions of said path.

32. The method according to claim 31 wherein the magnetic object is integral to said at least one movable fluidic network component.

33. The method according to claim 31 wherein the magnetic object is joined with said at least one movable fluidic network component at the first location and/or orientation and in the second location and/or orientation the magnetic object is removed from said at least one movable fluidic network component.

* * * * *